United States Patent [19]

Allen et al.

[11] 4,256,570

[45] Mar. 17, 1981

[54] PURIFICATION OF PHOSPHORIC ACID

[75] Inventors: Hanceford L. Allen, Bartow; William W. Berry, Lakeland, both of Fla.

[73] Assignee: International Minerals & Chemical Corporation, Northbrook, Ill.

[21] Appl. No.: 22,083

[22] Filed: Mar. 19, 1979

[51] Int. Cl.³ .......................... B03B 1/00; B03D 3/06; C01B 25/16
[52] U.S. Cl. .................................. 209/5; 423/321 R; 23/293 R
[58] Field of Search ............... 423/321 R, 320, 321 S; 23/293 R; 209/5

[56] References Cited

U.S. PATENT DOCUMENTS

| T971,006 | 6/1978 | Smith | 423/321 |
|---|---|---|---|
| 2,936,888 | 5/1960 | Williams | 423/321 R |
| 3,099,622 | 7/1963 | Woerther | 423/321 R X |
| 3,186,793 | 6/1965 | Gillis et al. | 423/321 R |
| 3,306,714 | 2/1967 | Goren | 423/321 |
| 3,697,233 | 10/1972 | Peck | 423/308 |
| 3,711,591 | 1/1973 | Hurst | 423/12 |
| 3,907,680 | 9/1975 | Hill | 423/321 R X |
| 3,993,733 | 11/1976 | Irani | 423/313 |
| 3,993,735 | 11/1976 | Irani | 423/321 R |
| 4,064,220 | 12/1977 | Alon | 423/321 R |
| 4,087,512 | 5/1978 | Reese et al. | 423/321 R |

FOREIGN PATENT DOCUMENTS 7605359  8/1978  France ......................... 423/321

OTHER PUBLICATIONS

Hurst "Recovering Uranium from Wet Process Phosphoric Acid" Chemical Engineering, Jan. 3, 1977, pp. 56–57.
"$P_2O_5$ The Production of Green Phosphoric Acid with Pittsburgh Activated Carbon" Calgon Technical Bulletin 1968.
Michel–"Laboratory Procedure for the Production of Green Wet Process $P_2O_5$ ..." Calgon Technical Paper (1970).
Blumberg, "Newer Development in Cleaning Wet Process Phosphoric Acid" (1975).

Primary Examiner—O. R. Vertiz
Assistant Examiner—Gregory A. Heller
Attorney, Agent, or Firm—Schuyler, Banner, Birch, McKie & Beckett

[57] ABSTRACT

Phosphoric acid is purified by a process which comprises treating the crude acid solution with a body feed agent and a flocculating agent to cause a portion of the impurities to settle out, and contacting the partially clarified acid with activated carbon for further impurity removal. In the preferred process, hot wet process phosphoric acid from the plant filter is first cooled to a temperature of from about 100° F. to about 130° F. and then treated in the above-described manner.

6 Claims, No Drawings

PURIFICATION OF PHOSPHORIC ACID

The present invention relates to a process for removing impurities from crude phosphoric acid solutions. More particularly, the present invention relates to a process for removing humates and inorganic salt forming compounds from wet process phosphoric acid.

"Wet Process" phosphoric acid is conventionally prepared by acidulating phosphate rock (which contains calcium phosphate) with sulfuric acid to produce phosphoric acid and insoluble calcium sulfate (gypsum). Phosphate rock, such as that mined in Florida and in many countries of the world such as Morocco, contains many impurities including carbonaceous matter, $SiO_2$ and other metallic contaminants. During the acidulation step, some of the carbonaceous material is converted to humic acids and related organic compounds generally referred to as humates. These humates are generally responsible for the black color of crude wet process phosphoric acid. This black acid product is normally filtered to remove gypsum, silica and other miscellaneous impurities. Filter-grade acid produced at this stage of the conventional process, however, still contains many metallic impurities, traces of unreacted silica, gypsum solids that crystallize after filtration and suspended humates of various particle sizes.

While filter-grade acid containing these impurities is not objectionable for fertilizer manufacture, for other applications filtered acid must be further purified. For example, wet process phosphoric acid contains significant amounts of uranium which can be separated for recovery by solvent extraction. The presence of impurities, especially the humates, tend to cause the formation of stable emulsions with the organic solvents used in the uranium extraction process. The buildup of these emulsion products in a countercurrent extraction system can seriously interfere with the extraction of uranium.

Those concerned with the recovery of uranium from wet process phosphoric acid have generally recognized that pretreatment of black phosphoric acid to remove humates is desirable. Among the techniques suggested for this clean-up step are oxidation, flocculation-clarification, treatment with activated carbon, and calcination. See Hurst, "Recovering Uranium From Wet Process Phosphoric Acid," *Chemical Engineering*, Jan. 3, 1977, pp. 56–57.

Smith, Defensive Publication No. T971,006 describes a sedimentation process for purifying wet process phosphoric acid in which a finely divided silica or silicate is employed as a settling aid. Among the silicates described in the Smith specification are clay, such as bentonite. Smith also describes the use of polymeric flocculating agents.

For prior art descriptions of activated carbon treatments to clarify phosphoric acid solutions, see e.g., Gillis, U.S. Pat. No. 3,186,793; Irani, U.S. Pat. No. 3,993,735, and "$P_2O_5$—The Production of Green Phosphoric Acid with Pittsburgh Granular Activated Carbon," Calgon Technical Bulletin (1968).

Reese, U.S. Pat. No. 4,087,512 describes a method for removing solid organic material from wet process phosphoric acid by mixing the acid with an organic hydrocarbon such as kerosene to form an emulsion which contains the organic impurities. This emulsion layer then is drawn off to leave a purified aqueous acid phase. Hill, U.S. Pat. No. 3,907,680 describes a process for purifying crude aqueous phosphoric solutions which comprises passing the crude solution through a layer of specially prepared perlite filter aid. Alon, U.S. Pat. No. 4,064,220 describes a method for removing dissolved organic matter from an aqueous acidic solution which comprises adding to the solution an aldehyde or aldehyde oligomer and a compound copolymerizable with an aldehyde followed by allowing the polymerization reaction to occur and separating the resulting polymer. For other methods of clarifying phosphoric acid solutions, see Goren, U.S. Pat. No. 3,306,714; Williams, U.S. Pat. No. 2,936,888; Mazurek, U.S. Pat. No. 2,988,504 and Woerther, U.S. Pat. No. 3,099,622.

As demonstrated by the foregoing, the art describes numerous attempts to solve the problem of crude phosphoric acid clarification. In view of the continued dwindling supply of conventional energy sources, any process which would materially enhance the development of alternative energy sources such as uranium would be a most welcome advance.

It is an object of the present invention, therefore, to provide a process for the purification of phosphoric acid and in particular for the purification of wet process phosphoric acid useful in uranium solvent extraction processes which avoids the problems of the prior art.

More specifically, it is an object of the present invention to provide a process for the efficient and economic removal of impurities from crude phosphoric acid solutions.

In accordance with these and other objectives the present invention provides a process for purifying phosphoric acid comprising the steps of: (a) mixing said acid with a body feed agent to cause floccules of suspended impurities to form; (b) adding a flocculating agent to the mixture of step (a) in an amount sufficient to cause said floccules to settle; (c) separating the supernatant acid solution from the settled sludge; and (d) contacting said supernatant acid solution with activated carbon to remove remaining impurities.

While the purification process of the present invention is broadly applicable to removal of organic and inorganic impurities from phosphoric acid solutions of any source, it is particularly well suited to the removal of impurities found in filter grade wet process phosphoric acid produced as described above. The invention will, therefore, be described with reference to purification of wet process phosphoric acid.

In the first step of one embodiment of the process of the present invention, wet process phosphoric acid from the gypsum filter (at a temperature of about 140°–150° F.) is subjected to a cooling step. In general, cooling to a temperature in the range of from about 100° F. to about 130° F. is suitable. The lower limit of the cooling temperature range is dictated primarily by economic considerations. It has been found that cooling filter-grade phosphoric acid much below 100° F. requires considerable additional equipment thus resulting in additional capital cost. Cooling to a temperature in the range of about 115°–125° F. is preferred. Most preferred is cooling to about 120° F. The cooling preferably should take place over a relatively short period of time. The acid cooling step may be accomplished in suitable equipment of any conventional design. In practice, spiral coolers of the type normally used in phosphoric acid processing are well suited to this application and effect very rapid cooling.

As would be expected, the cooling of the crude acid reduces the supersaturation of the solution with respect to inorganic solids such as gypsum and the like. Despite this fact it is known in the art that cooling makes phosphoric acid more viscous and therefore reduces the rate of settling of precipitated solids. See, Woerther, U.S. Pat. No. 3,099,622. For this reason the prior art teaches away from employing cooling in conjunction with a settling process. The prior art practice of cooling the phosphoric acid prior to solvent extraction is directed to improving extraction coefficients and does not provide any teaching with respect to the advantages achieved by the combined purification process of the present invention.

In the case of impure phosphoric acid solutions from sources other than the hot plant filter stream, it may not be necessary to cool the acid as the first step of this process.

The next step of the process of the present invention comprises mixing the cooled crude acid solution with a body feed material. The purpose of this additive is to build up floccules of the suspended insoluble impurities, e.g., insoluble humates, and, if possible, to absorb a portion of the soluble humates to reduce the humic load to the subsequent carbon column system. Among the suitable body feed materials are clays and similar substances as described in Smith, Defense Publication No. T971,006 and in U.S. Application Ser. No. 777,252, now abandoned in favor of Continuation Application Ser. No. 972,842 (commonly assigned with the present application). Most preferred as a body feed material in the purification of wet process phosphoric acid are the bentonite clays, especially activated bentonite of the type found in Mississippi. The activated clay body feed is preferably added at a particle size of about 200 mesh although larger and smaller particle sizes will be generally equally effective.

In general, the clay body feed material can be added to the phosphoric acid solution in an amount of from about 0.05% to 1% by weight of the solution. In actual practice, amounts of about 0.3% to 0.35% have proven most preferred. The mixture of the cooled phosphoric acid solution and the body feed should be effected by vigorous agitation, e.g., in a stirred reactor. Retention time in this agitation stage should be generally from about 5 to 10 minutes or less. Extended agitation can result in mechanical attrition of the floccules built up in the system.

As a result of the body feed addition, the suspended organic and inorganic materials in the solution tend to agglomerate. After a suitable retention time in the stirred reactor, phosphoric acid solution is mixed with a flocculating agent to promote sedimentation of the suspended solids. The flocculating agent should be chosen so as to be compatible with the body feed additive employed. Observation of the surface charge properties (i.e., zeta potentials) of the components and selection of compatible mixtures is well known in the art and does not constitute part of this invention. See, for example, Smith Defensive Publication No. T971,006. Among the suitable flocculating agents for the practice of the present invention are various commercially available polyelectrolytes. One such flocculating agent is Nalco 7873 produced by Nalco Chemical Company. The combination of a body feed additive and a flocculating agent serves to remove a portion of both the suspended inorganic solids and the humates present in crude acid solution.

Flocculating agent is generally added in a clarifying amount, i.e., an amount sufficient to produce rapid settling over a reasonable period of time. In general, amounts from about 5 to about 15 ppm based on the acid solution are effective. Typically, amounts of about 10 ppm are suitable when employing the flocculating agents described above.

In operation, the flocculating agent is added to the acid solution containing body feed and agitated gently for about 1½ to about 2 minutes. After a suitable mixing time the suspension is allowed to settle. In practice, the settling is achieved by continuous overflow to a clarifier in which typical area flow rates are between about 0.1 and 0.15 gallons per minute per square foot. Flow rates through the clarifier, will, of course, vary with the particular design of the equipment.

The sludge from the clarifier can be sent back to the phosphoric plant filter or to an underflow filter specifically designed for this application. This mixture is more easily processed through conventional filtering equipment than regular phosphoric acid sludge.

The clarified acid is then forwarded to an activated carbon absorption unit. As will be recognized, the nature and quantity of impurities in crude wet process phosphoric acid will vary widely with the source of phosphate rock employed and even with the location of phosphate deposits within a single source. Accordingly, the impurities load on a purification system can vary within wide limits. Activated carbon columns are particularly adversely affected by wide variations in impurity levels. Carbon absorbents must be regenerated when the levels of the removed contaminants build up to a certain point. It is difficult to maintain a uniform schedule of continuous operation when the time between regeneration cycles varies widely depending on the column input. As a result of the cooling and clarifying pretreatment steps of the present invention, however, a relatively uniform acid stream is fed to the carbon columns irrespective of variations in the impurity levels of the source acid. Thus, uniform and predictable carbon absorption operations can be run with carbon regeneration at constant predetermined intervals. Moreover, the reduction in gross suspended solids by the cooling and clarifying pretreatment steps of the present invention results in a decreased load on the carbon columns and an increased carbon life between regeneration cycles.

The carbon absorption step of the present invention can be accomplished by any of the techniques suggested in the prior art. In the preferred manner of operation the crude acid is passed upwardly through an expanded bed of granular carbon. Up-flow carbon columns, which per se are known, require some type of distributor, such as a bubble cap or perforated plate, to insure uniform acid flow up through the column. Parameters of operation of the column are not critical and well within the skill of the practitioner to select. The height/diameter ratio can vary over a wide range and is not particularly critical as is well known to those skilled in the art. In this type of system, feed acid throughputs of from about 1 to 2 gpm per square foot of column cross section are easily handled. The temperature of the acid feed to the column is not critical and may vary depending on the prior processing of the acid. A series of columns is satisfactory for accomplishing contact of acid and carbon.

After the carbon columns have been in use for a time sufficient to degrade the carbon activity to the minimum acceptable level, the column is removed from service and the carbon is regenerated. The preferred method of regeneration is the chemical regeneration described in pending U.S. Application Ser. No. 022,082, (Atty. Docket No. 5608) entitled "Regeneration of Activated Carbon" filed on even date herewith in the names of Allen, Berry and Leibfried, and commonly assigned. This regeneration process employs a number of specific washes each regeneration cycle and a periodic final nitric acid wash when needed. The nitric acid wash is irreversibly deleterious to the carbon activity and therefore should be used as infrequently as possible. Without the above-described pretreatment steps according to the process of the present invention, nitric acid washes are required every 5 to 7 regeneration cycles. When the cooling and clarification pretreatment steps of the present invention are employed, the carbon can go up to 15 to 20 cycles before a nitric acid wash is required. At this frequency the carbon appears to be almost infinitely regeneratable.

The following specific example is intended to illustrate more fully the nature of the present invention without acting as a limitation on its scope.

EXAMPLE

Brown phosphoric acid from a conventional wet process phosphoric acid plant containing approximately 27.9% $P_2O_5$ and 0.129 grams per liter of U, at a temperature of about 140° F., was introduced to a purification unit at the rate of about 10 gallons per minute. The acid was cooled in a heat exchanger to 119° F. A bentonite clay was added to the cooled acid in stirred-tank mixer at the rate of about 0.3% by weight of the acid. Flocculant, specifically Nalco 7873, was added at the rate of about 15 ppm by weight in a flocculation tank. This material was overflowed from the flocculation tank to a clarifier where the solids were permitted to settle. In this clarification step a major portion of the suspended solids and acid color were removed. In this example the solids in the brown phosphoric acid were 3.12% by volume and the acid was a dark brown color. The partially clarified acid contained 0.14% solids by volume and 58% of the color bodies had been removed, as measured on a spectrophotometer.

This partially clarified acid was then fed to the inlet of a carbon column system at the rate of about 8 gallons per minute. The carbon column system was operated in a series upflow expanded bed manner, utilizing five columns approximately 2.5 feet in diameter with a settled carbon bed depth of about 6 feet. The acid leaving the column (clean acid) was light green in color and overall color body removal was approximately 92% as measures on a spectrophotometer.

While certain specific embodiments of the invention have been described with particularity herein, it will be recognized that various modifications thereof will occur to those skilled in the art. Therefore, the scope of the invention is to be limited solely by the scope of the appended claims.

We claim:

1. A process for purifying filter-grade wet process phosphoric acid comprising the steps of:
    (a) cooling said filter-grade acid to a temperature of from about 100° F. to about 130° F.;
    (b) mixing the cooled acid of step (a) with a body feed agent to cause floccules of suspended impurities to form;
    (c) adding a flocculating agent to the mixture of step (b) in an amount sufficient to cause said floccules to settle;
    (d) separating the supernatant acid solution from the settled sludge; and
    (e) contacting said supernatant acid solution with granular activated carbon to remove remaining impurities.

2. A process for purifying phosphoric acid comprising the steps of:
    (a) cooling the phosphoric acid.
    (b) mixing said acid with a body feed agent to cause floccules of suspended impurities to form;
    (c) adding a flocculating agent to the mixture of step (a) in an amount sufficient to cause said floccules to settle;
    (d) separating the supernatant acid solution from the settled sludge; and
    (e) contacting said supernatant acid solution with granular activated carbon to remove remaining impurities.

3. The process of claim 1 wherein said filter-grade acid is cooled to a temperature in the range of from about 115° F. to 125° F.

4. The process of claim 1 or 2 wherein said body feed agent comprises an activated clay.

5. The process of claim 4 wherein said clay is a bentonite.

6. The process of claim 1 or 2 wherein said supernatant acid solution is contacted with said activated carbon in an up flow column.

* * * * *